US009788281B2

(12) United States Patent
Henry et al.

(10) Patent No.: US 9,788,281 B2
(45) Date of Patent: Oct. 10, 2017

(54) TRIGGERING CLIENT DEVICE PROBING BEHAVIOR FOR LOCATION APPLICATIONS

(71) Applicant: Cisco Technology, Inc., San Jose, CA (US)

(72) Inventors: Jerome Henry, Pittsboro, NC (US); Allen J. Huotari, Garden Grove, CA (US); Pooya Monajemi, Irvine, CA (US); Ahmadreza Hedayat, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 88 days.

(21) Appl. No.: 14/495,956

(22) Filed: Sep. 25, 2014

(65) Prior Publication Data

US 2016/0095071 A1 Mar. 31, 2016

(51) Int. Cl.
*H04W 52/28* (2009.01)
*H04W 52/14* (2009.01)
*H04W 52/32* (2009.01)
*H04B 7/06* (2006.01)
*H04W 84/12* (2009.01)
*H04W 52/42* (2009.01)
*H04W 48/12* (2009.01)

(52) U.S. Cl.
CPC ........ *H04W 52/283* (2013.01); *H04B 7/0617* (2013.01); *H04W 52/143* (2013.01); *H04W 52/327* (2013.01); *H04W 48/12* (2013.01); *H04W 52/42* (2013.01); *H04W 84/12* (2013.01)

(58) Field of Classification Search
CPC ............. H04W 52/283; H04W 52/327; H04W 52/143; H04W 48/12; H04W 52/42; H04W 84/12; H04B 7/0617; H04L 5/00
See application file for complete search history.

(56) References Cited

U.S. PATENT DOCUMENTS

| | | | |
|---|---|---|---|
| 7,117,018 B2 | 10/2006 | Lewis | |
| 7,424,268 B2 | 9/2008 | Diener et al. | |
| 7,460,836 B2 | 12/2008 | Smith et al. | |
| 7,561,904 B2 | 7/2009 | Lagnado | |
| 7,680,457 B2 | 3/2010 | Jin et al. | |
| 8,000,418 B2 | 8/2011 | Jin | |
| 8,059,744 B2 | 11/2011 | Jin et al. | |
| 8,134,503 B2 | 3/2012 | Na et al. | |
| 8,254,845 B2 | 8/2012 | Na et al. | |
| 8,295,384 B2 | 10/2012 | Stager et al. | |

(Continued)

OTHER PUBLICATIONS

Nikolaidis, et al., "Cone of Silence: Adaptively Nulling Interferers in Wireless Networks," UCL Department of Computer Science, Research Note RN/10/02, Jan. 30, 2010, pp. 1-14.

(Continued)

*Primary Examiner* — Christopher Grey
(74) *Attorney, Agent, or Firm* — Edell, Shapiro & Finnan, LLC

(57) ABSTRACT

In one embodiment, a wireless access point that serves at least one client device in a wireless local area network transmits frames to the at least one client device so that the frames are received by the at least one client device with a receive signal strength so as to control the transmission of probe request messages by the at least one client device.

27 Claims, 15 Drawing Sheets

(56) References Cited

U.S. PATENT DOCUMENTS

| | | | |
|---|---|---|---|
| 2004/0087314 A1* | 5/2004 | Duncan | G01C 21/00 455/456.1 |
| 2005/0265393 A1* | 12/2005 | Fischer | H04W 74/002 370/474 |
| 2006/0258371 A1* | 11/2006 | Krishnamurthi | H04W 4/02 455/456.1 |
| 2007/0099571 A1 | 5/2007 | Withers et al. | |
| 2008/0051100 A1 | 2/2008 | Kruys et al. | |
| 2009/0113052 A1 | 4/2009 | Doshi et al. | |
| 2010/0075612 A1* | 3/2010 | Oi | H04B 17/327 455/67.13 |
| 2010/0118830 A1 | 5/2010 | Stephenson et al. | |
| 2010/0246461 A1 | 9/2010 | Hsieh et al. | |
| 2011/0002295 A1 | 1/2011 | Ghosal et al. | |
| 2011/0012787 A1 | 1/2011 | Na et al. | |
| 2011/0026441 A1 | 2/2011 | Diener et al. | |
| 2011/0026630 A1 | 2/2011 | Stager et al. | |
| 2011/0306297 A1 | 12/2011 | Chang et al. | |
| 2012/0034874 A1 | 2/2012 | Yiu et al. | |
| 2012/0063337 A1* | 3/2012 | Shukla | H04W 28/22 370/252 |
| 2012/0087332 A1 | 4/2012 | Kim et al. | |
| 2012/0122502 A1 | 5/2012 | Shin et al. | |
| 2012/0214403 A1 | 8/2012 | Shany et al. | |
| 2012/0264388 A1 | 10/2012 | Guo et al. | |
| 2013/0012134 A1 | 1/2013 | Jin et al. | |
| 2013/0028158 A1 | 1/2013 | Lee et al. | |
| 2013/0044703 A1 | 2/2013 | Trainin | |
| 2013/0064175 A1 | 3/2013 | Pandey et al. | |
| 2013/0077505 A1 | 3/2013 | Choudhary et al. | |
| 2013/0215938 A1 | 8/2013 | Hansen et al. | |
| 2013/0279381 A1* | 10/2013 | Sampath | H04W 48/08 370/311 |
| 2013/0329619 A1 | 12/2013 | Carty et al. | |
| 2014/0064231 A1* | 3/2014 | Park | H04W 12/06 370/329 |
| 2014/0098681 A1 | 4/2014 | Stager et al. | |
| 2014/0171069 A1 | 6/2014 | Pang et al. | |
| 2014/0171108 A1* | 6/2014 | Waters | H04W 4/02 455/456.1 |
| 2016/0037439 A1* | 2/2016 | Shamis | H04W 48/16 370/329 |
| 2016/0095079 A1* | 3/2016 | Monajemi | H04W 60/06 370/338 |

OTHER PUBLICATIONS

Franklin et al., "Passive Data Link Layer 802.11 Wireless Device Driver Fingerprinting", 15th USENIX Association-Security Symposium, Jul. 31, 2006: 15th, pp. 167-178.

* cited by examiner

TRIGGERING CLIENT DEVICE PROBING BEHAVIOR FOR LOCATION APPLICATIONS

TECHNICAL FIELD

The present disclosure relates to wireless networks.

BACKGROUND

Bring Your Own Device (BYOD) is a term coined to refer to devices that have wireless connectivity and that users carry with them into a variety of networking environments. One such networking environment is a wireless local area network, i.e., a Wi-Fi® networking environment. Thus, a BYOD can also be considered a Wi-Fi client, simply referred to herein as a wireless client device.

In general, BYOD devices are battery-powered and therefore try to conserve energy in order to extend battery life. Consequently, probing algorithms have become more complex, pushing most BYODs to probe only when needed, such as when the BYOD detects that the received signal from its serving wireless access point is weak or drops dramatically (indicating either movement or being at edge of the cell, or both).

DESCRIPTION OF EXAMPLE EMBODIMENTS

Overview

In one embodiment, a wireless access point that serves at least one client device in a wireless local area network transmits frames to the at least one client device so that the frames are received by the at least one client device with a receive signal strength so as to control the transmission of probe request messages by the at least one client device.

Example Embodiments

Figure 1:
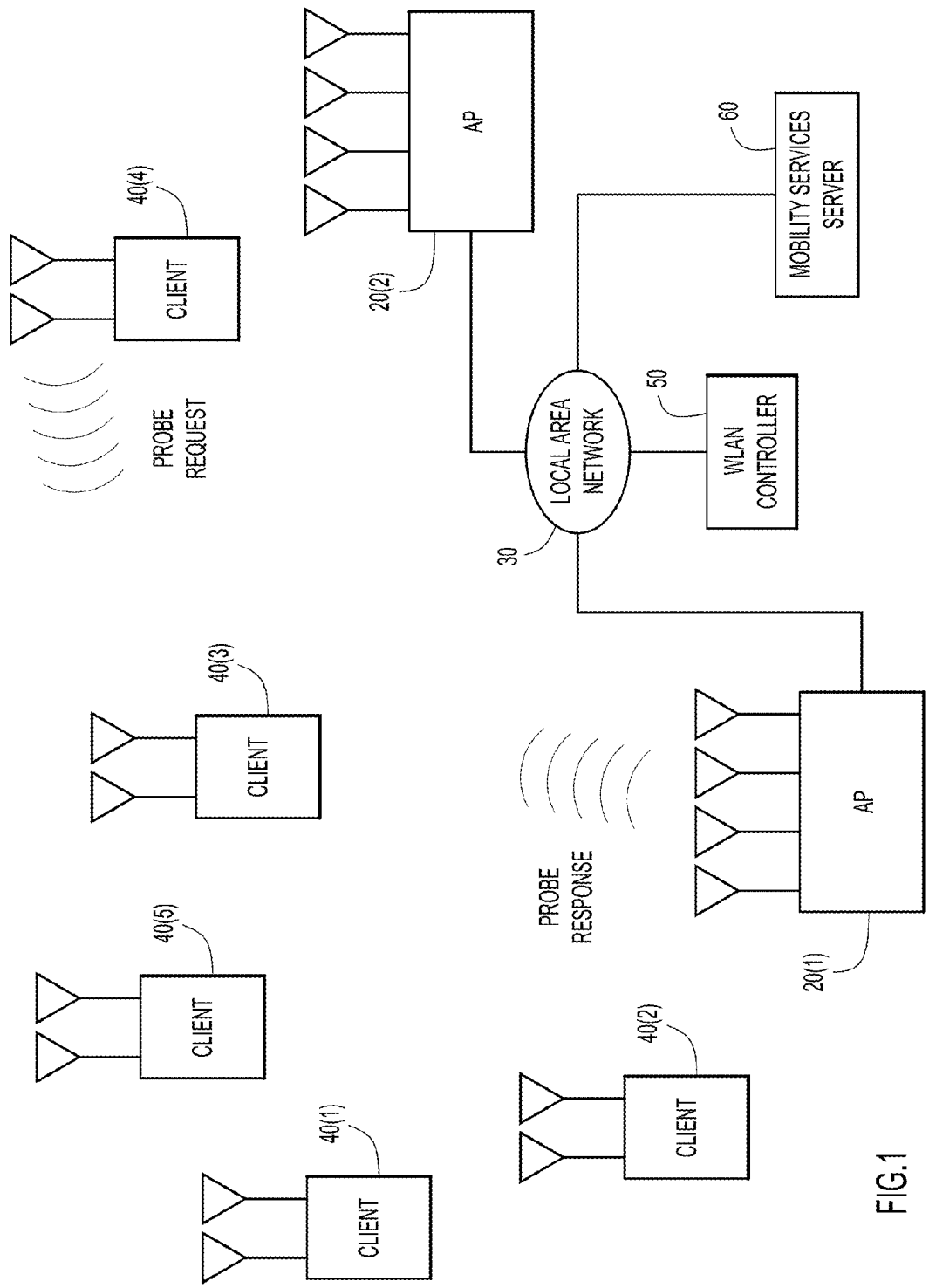
FIG. 1 is a block diagram of a wireless network in which one or more access points and associated back-end infrastructure are configured to perform probe requesting tuning techniques presented herein, according to an example embodiment.

Reference is first made to FIG. 1. FIG. 1 shows a networking environment 10 that supports wireless network capability, such as a Wi-Fi wireless local area network (WLAN). To this end, there are multiple wireless access points (APs), two of which are shown as an example at reference numerals 20(1) and 20(2). The APs 20(1) and 20(2) support WLAN connectivity for multiple wireless client devices (also called "clients" herein) shown at reference numerals 40(1)-40(5). It should be understood that FIG. 1 is only a simplified example. There may be numerous more (or less) clients in a real network deployment.

There is back-end infrastructure that is used for control and other functions. Specifically, the APs 20(1) and 20(2) connect to a wired local area network 30 to which are also connected a WLAN controller 50 and a mobility services server 60. The WLAN controller 50 performs control functions for the APs 20(1) and 20(2) and clients 40(1)-40(5) as described further hereinafter. In addition, and as described in more detail hereinafter, the mobility services server 60 performs, among other things, location service functions to track the locations of clients based on data gathered from signals received at multiple APs (or other wireless devices at fixed locations). Though shown as separate entities, the WLAN controller 50 and mobility services server 60 may reside on the same physical apparatus, or may be separate or combined applications running on a data center.

As shown in FIG. 1, clients send probe requests, sometimes to ensure that the AP they are associated to is still present, and often upon detecting being at the edge of a cell. A probe request message (frame) is sent by a client device to either confirm that the AP that it is associated to is in service and the AP's signal strength is sufficient, or to locate another AP when the client can no longer receive signal with sufficient strength from the AP to which it is currently associated or simply as routine scanning for additional APs. In FIG. 1, client 40(4) is shown transmitting a probe request at a particular instant of time. Client 40(4) is associated to AP 20(1) in this example. FIG. 1 also shows that the AP 20(1) transmits a probe response to client 40(4).

The probing behavior of client devices in WLANs has been studied. Some devices probe too often. For example, in a large venue WLAN deployment, such as a stadium, a client device frequently is at the border of a coverage region (cell), and it resorts to "panic" probing even if the client device is stationary. Other examples include public events where clients spend time at the edge of a cell (stop and go) as users move around.

Some clients do not probe when, for certain reasons, it would be better if they did, i.e., when a network manager wants the clients to probe. Typically, a BYOD receiving good signal from the AP that it is associated to, and not needing to check on the AP signal, will stop sending probe requests, especially when network applications are in use. A client device will stop transmitting probe requests for battery conservation purposes. Devices that transmit probe requests too frequently often present a potential problem for the mobility services server 60, because the mobility services server 60 needs to process each probe request received by one or more APs and forwarded from each AP that received it through the WLAN controller 50 to the mobility services server 60.

The mobility services server 60 has limited capability in the maximum number of probes that can be processed per second. Excessive probe requests are also a problem because they consume airtime on all the channels and cells that are being probed, and not always associated with an anticipated movement of a client between cells. Conversely, clients that do not probe often enough (and when it is necessary for them to probe) cause the location information generated and maintained by the mobility service server 60 to become stale.

Presented herein are techniques to complement existing or new location procedures, by influencing, i.e., indirectly controlling, the way clients send probe requests. These techniques are useful to limit the probe requests sent by devices that probe too often without needing the probe request messages for location purposes, and to trigger target client devices to transmit probe request messages when they are needed in order for the mobility services server to confirm their location.

Figure 2:
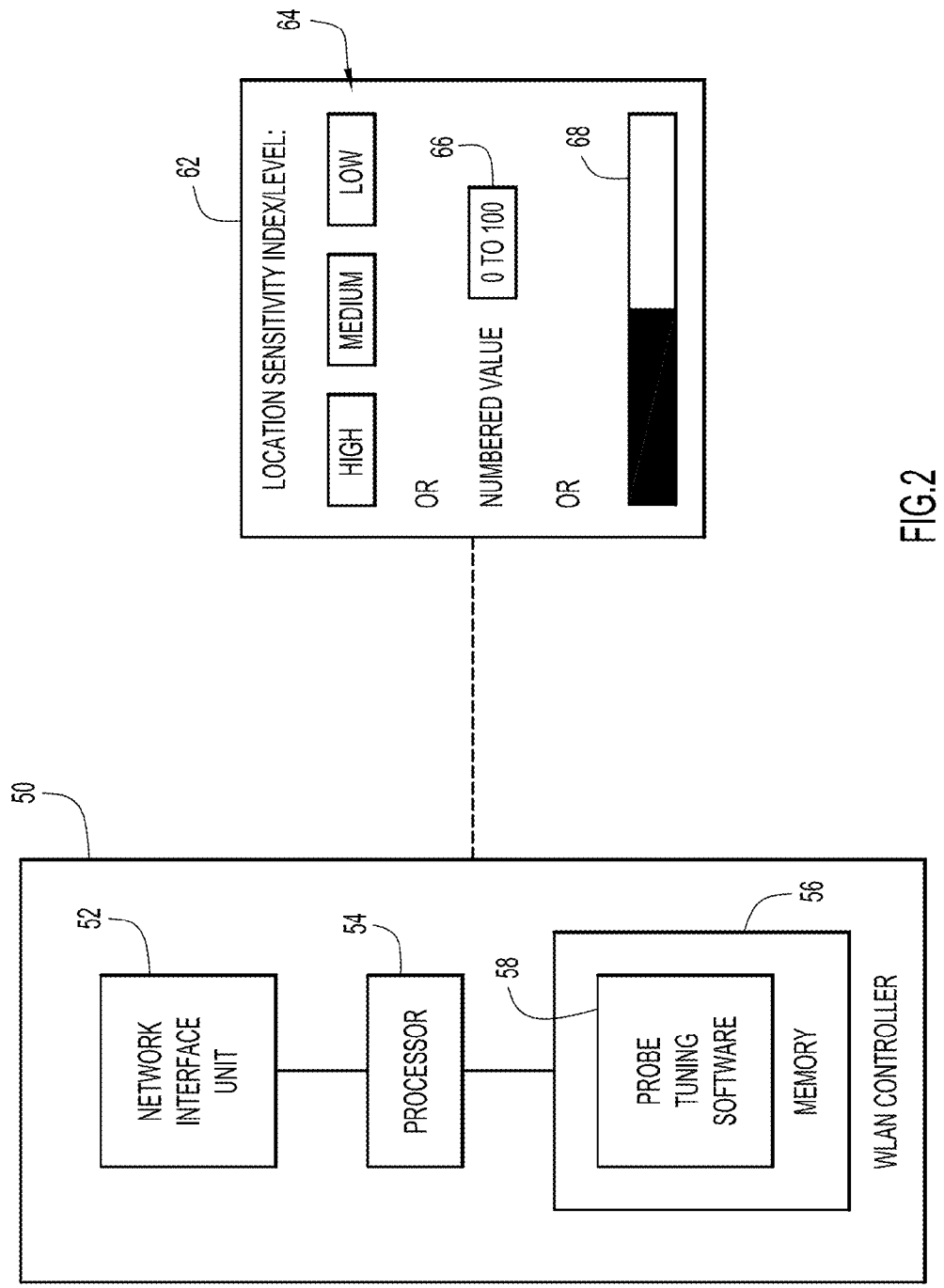
FIG. 2 is a block diagram of a wireless local area network controller and a user interface screen useful to set a location sensitivity index that controls how many probe request messages from a client device are supplied to a location service function, according to an example embodiment.

Reference is now made to FIG. 2. FIG. 2 shows a block diagram of an apparatus, e.g., the WLAN controller 50, mobility services server 60 or some other general control apparatus, and an example graphical user interface 62 for adjusting settings of the WLAN controller 50. The WLAN controller 50 includes a network interface unit 52, a processor 54 and a memory 56. The memory stores instructions for probe tuning software 58. The processor 54 executes the instructions for the probe tuning software 58 to perform the operations described herein for setting parameters to tune how many probe requests are fed to the mobility services server 60. It should be understood that the mobility services server 60 may take on a form similar to that shown in FIG. 2 (including a network interface unit, a processor and a memory storing software that is executed by the processor) to carry out the operations described herein as being performed by the WLAN controller 50.

The memory 56 may comprise read only memory (ROM), random access memory (RAM), magnetic disk storage media devices, optical storage media devices, flash memory devices, electrical, optical, or other physical/tangible memory storage devices. The processor 54 is, for example, a microprocessor or microcontroller that executes instructions stored in memory 56. Thus, in general, the memory 54 may comprise one or more tangible (non-transitory) computer readable storage media (e.g., a memory device) encoded with software comprising computer executable instructions and when the software is executed (by the processor 56) it is operable to perform the operations described herein.

The graphical user interface 62 may be generated by the probe tuning software 58 for presentation on a web page to an authorized administrator. The user interface 62 is provided to allow network administrators to tune probe behaviors of clients by configuring a location sensitivity index/level on the wireless infrastructure (the WLAN controller 50 and/or mobility services server 60). This index or level could be in the form of a high, medium, low level selector as shown at reference numeral 64, a numbered index (0 to 100) as shown at reference numeral 66 or a cursor-controlled slider bar as shown at reference numeral 68. Any of these or other user interface schemes may be used to tune the frequency at which location is updated for a given or all client devices. For example, sensitivity is sent to a higher level in networks where frequent location information is needed, and to a lower level in networks where location information refresh does not need to happen as often. This index determines how many probe requests transmitted by a client device per time interval are expected to be fed into the mobility services server 60 for location service functions.

When too many probe requests are received from a client (more than the threshold determined by the index), the WLAN controller 50, through execution of the probe tuning software 58, filters out those probe requests that exceed the threshold, so as to feed the mobility services server 60 with only the amount of probe requests needed for the level of accuracy desired. This does not require any specific action on the client, but rather a filtering of the received probe requests by the WLAN controller 50 (or by the mobility services server 60). This approach is frequently needed because some clients commonly send bursts of probe requests, sometimes for multiple profiles, and often at close intervals when at the edge of a cell/coverage region served by an AP.

Figure 3:
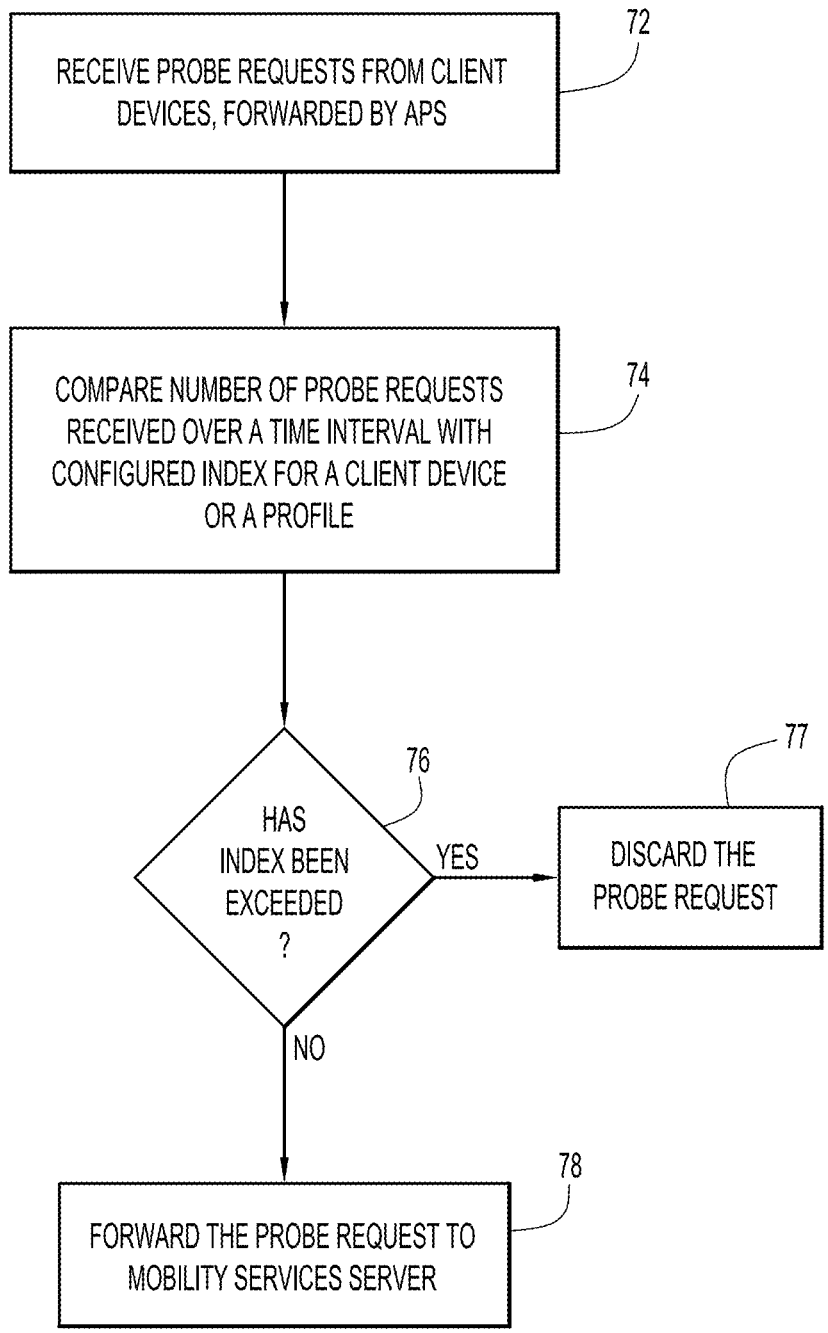
FIG. 3 is a flow chart depicting operations of a probe request tuning method, according to an example embodiment.

Turning now to FIG. 3, a flow chart is shown for a method 70 according to one aspect of the operation of the probe tuning software 58 in filtering probe requests received by APs. At 72, probe requests transmitted by client devices and received by one or more APs, are forwarded by the one or more APs to the WLAN controller 50. Information is stored that indicates receipt of probe request messages by the one or more APs, and which probe request messages were transmitted by one or more client devices. At 74, the WLAN controller 40 compares the number of probe requests received over a time interval (e.g., a certain number of seconds) with a configured index (that is set as described above in connection with FIG. 2) for a client device, or for a particular profile of a client device. Each client device may have one or more profiles with which it communicates with an AP, and an index level can be set for each profile. At 76, it is determined whether the index has been exceeded. If the index has been exceeded, then the probe request is discarded at 77. If the index has not been exceeded, then at 78, the probe request is forwarded to the mobility services server 60 for use in a location computation/update for the given client. Thus, in general, the index is adjusted for a given client device in order to change a frequency at which probe request messages are forwarded to a location service function for location determination made by the location service function for the given client device.

The WLAN controller 50 (or the mobility services server 60) keeps a timer for each client. When a client has not been located/seen (based on probe requests transmitted by that client) probing for more than a threshold timeout period, it is concluded that the client may have disconnected or is in a "comfort zone" where it determines that it does not need to send probe requests.

To summarize, FIG. 3 depicts a method in which, for a wireless network including one or more wireless access points each of which serves one or more client devices, information is stored that indicates receipt of probe request messages by the one or more wireless access points that were transmitted by the one or more client devices. A number of probe request messages received over a time interval is compared with an index for each of the one or more client devices. If the index has been exceeded for a given client device, probe request messages received during the time interval for the given client device are discarded. If the index has not been exceeded for a given client device, probe request messages received during the time interval for the given client device are forwarded to a location service function. The index may be adjusted for a given client device in order to change a frequency at which probe requests are forwarded to the location service function for location determination of the given client device. As depicted in FIG. 2, a graphical user interface may be displayed that includes one or more graphical elements that can be manipulated by a network administrator/user in order to adjust the index for the given client device.

Figure 4:
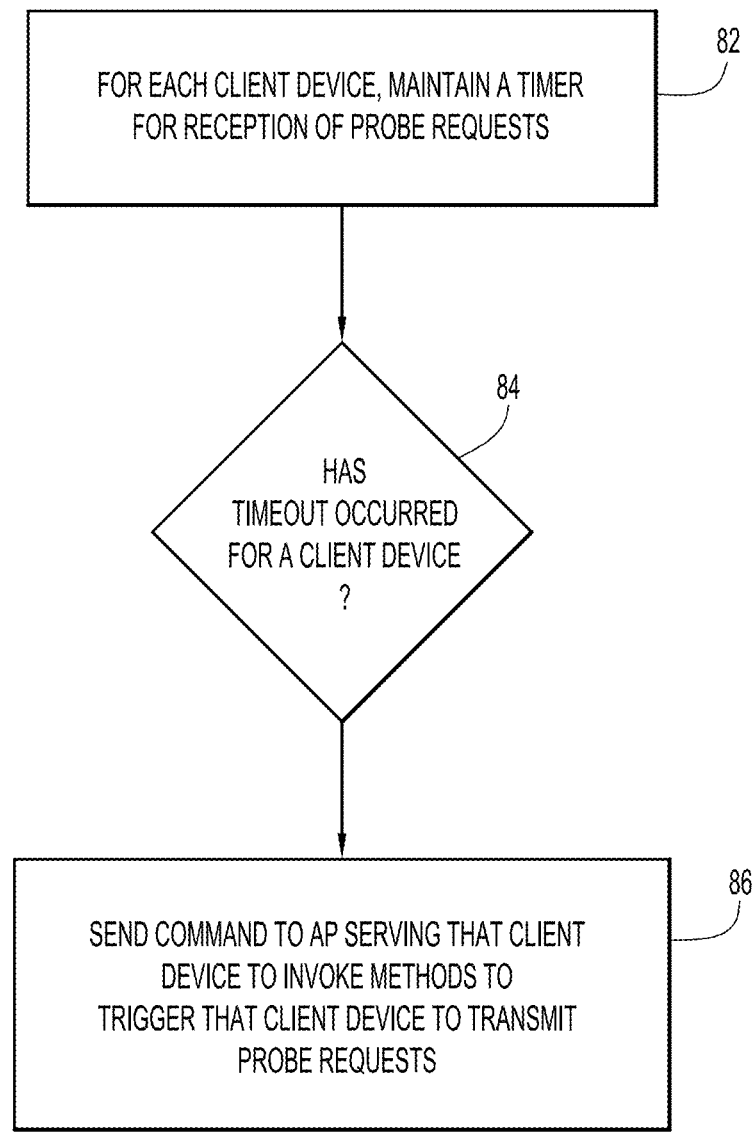
FIG. 4 is a flow chart depicting operations of a method to determine when to trigger a client device to transmit probe request methods, according to an example embodiment.

Reference is made to FIG. 4, which shows a flow chart for a method 80 used to determine when to command an AP to provoke a client device to transmit probe requests. At 82, for each client device, a timer is maintained that defines a threshold timeout period for reception of probe requests from the client device. At 84, it is determined whether a timeout has occurred for a client device. When a timeout has occurred for a client device, then at 86 the WLAN controller 40 (or mobility services server 50) sends a command to the AP that was last known to serve that client device to invoke methods at the AP to provoke/trigger that client device to transmit probe requests. The methods performed at an AP to trigger a client device to transmit probe requests are described hereinafter in connection with FIGS. 6-9.

Figure 5:
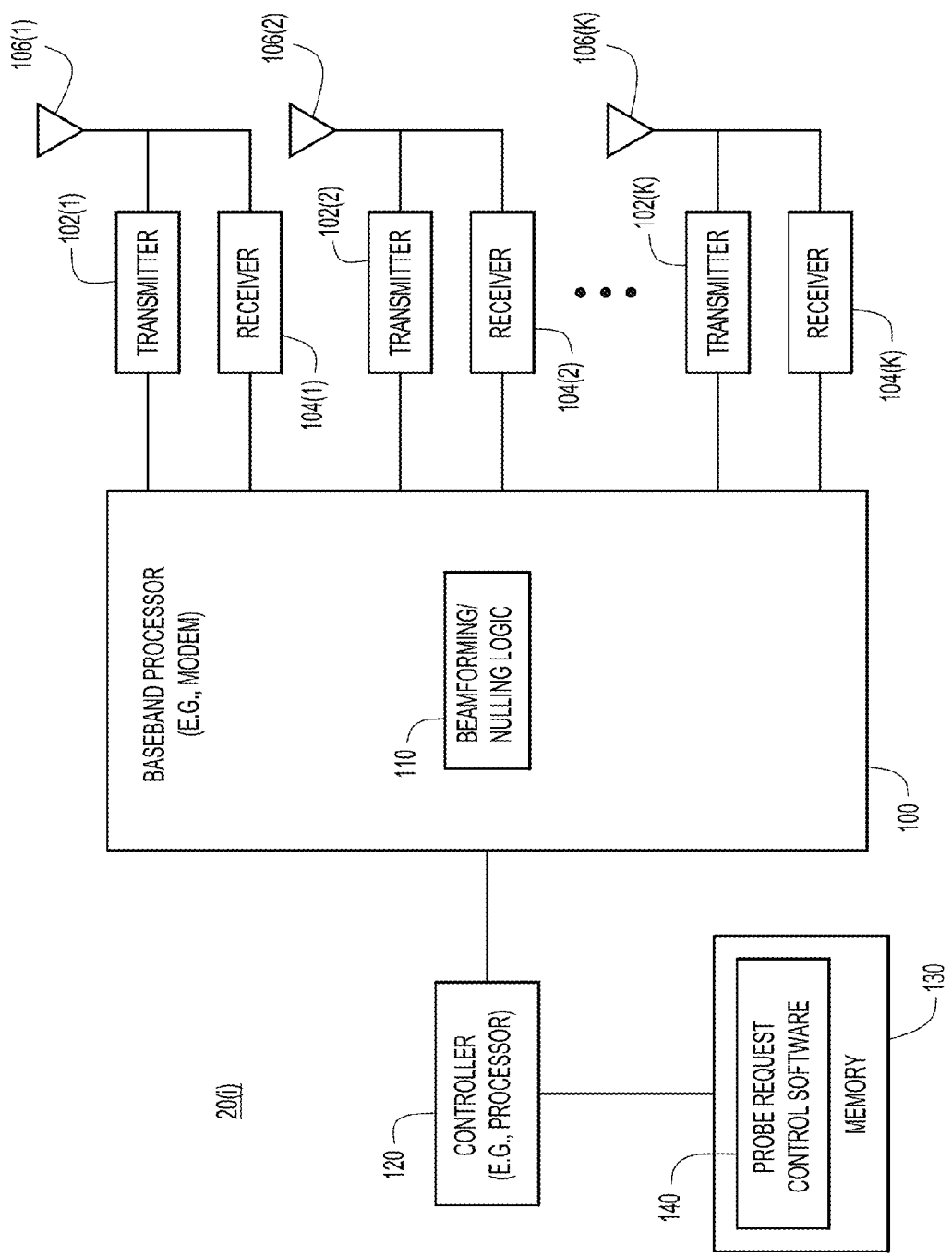
FIG. 5 is a block diagram of a wireless access point device operable to perform the probe request control techniques, according to an example embodiment.

Reference is now made to FIG. 5. FIG. 5 shows a block diagram of an AP that is capable of performing the techniques presented herein to control, i.e., trigger/provoke a client device to transmit probe requests or slow or stop/inhibit a client device from transmitting probe requests for a period of time. The AP shown in FIG. 5 is identified generally by reference numeral 20($i$) and is representative of any of the APs shown in FIG. 1.

The AP 20($i$) includes a baseband processor (e.g., modem) 100, a plurality of transmitters 102(1)-102(K), a plurality of receivers 104(1)-104(K), a plurality of antennas 106(1)-106(K), a controller 120 and a memory 130. Each transmitter 102(1)-102(K) is connected to a corresponding one of the plurality of antennas 106(1)-106(K), and likewise each receiver 104(1)-104(K) is connected to a corresponding one of the plurality of antennas 106(1)-106(K). The baseband processor 100 includes beamforming/spatial nulling logic 110 that is used to beamform a transmission. The beamforming logic 110 may be used to send a transmission with beamforming parameters to increase the receive signal strength, e.g., receive signal-to-noise ratio (SNR), at one or more client devices for signals transmitted by the AP, or with spatial nulling parameters to reduce the SNR at one or more client devices for signals transmitted by the AP. The baseband processor 100 may be implemented by fixed or programmable digital logic gates, such as in the form of an application specific integrated circuit (ASIC), or may be implemented by a dedicated digital signal processor, microprocessor or microcontroller. The beamforming logic 110 is only one of several functional blocks of the baseband processor 100, and again, it may be implemented by digital logic gates or by instructions executed by a microprocessor.

The controller 120 is coupled to the baseband processor 100 and provides higher level control for the AP 20($i$). The controller 120 may be a microprocessor or microcontroller. The memory 130 stores instructions that the controller 120 executes to perform the control functions of the AP 20($i$). Among these functions are probe request trigger/inhibit operations performed when the controller 120 executes the probe request control software 140 stored in memory 130.

The memory 130 may comprise read only memory (ROM), random access memory (RAM), magnetic disk storage media devices, optical storage media devices, flash memory devices, electrical, optical, or other physical/tangible memory storage devices. Thus, in general, the memory 130 may comprise one or more tangible (non-transitory) computer readable storage media (e.g., a memory device) encoded with software comprising computer executable instructions and when the software is executed (by the controller 120) it is operable to perform the operations described herein.

Thus, in general, a wireless access point is provided that includes at least one transmitter associated with a corresponding antenna, and a processor coupled to the transmitter. The processor causes frames (e.g., beacons as defined in the IEEE 802.11 standard) to be transmitted by the at least one transmitter so that the frames are received by at least one client device with a receive signal strength (reduced or increased) so as to control (provoke or slow/stop) the transmission of probe request messages by the at least one client device. The AP can adjust how it transmits the frames (e.g., beacons) so that the one or more client devices receive the frames with a reduced strength to provoke/cause/trigger the one or more client devices to transmit probe request messages because an insufficient number of probe request messages have been received from the one or more client devices. Conversely, the AP can adjust how it transmits the frames so that the one or more client devices receive the frames with an increased strength to cause the one or more client devices to slow or stop transmitting probe request messages.

Figure 6:
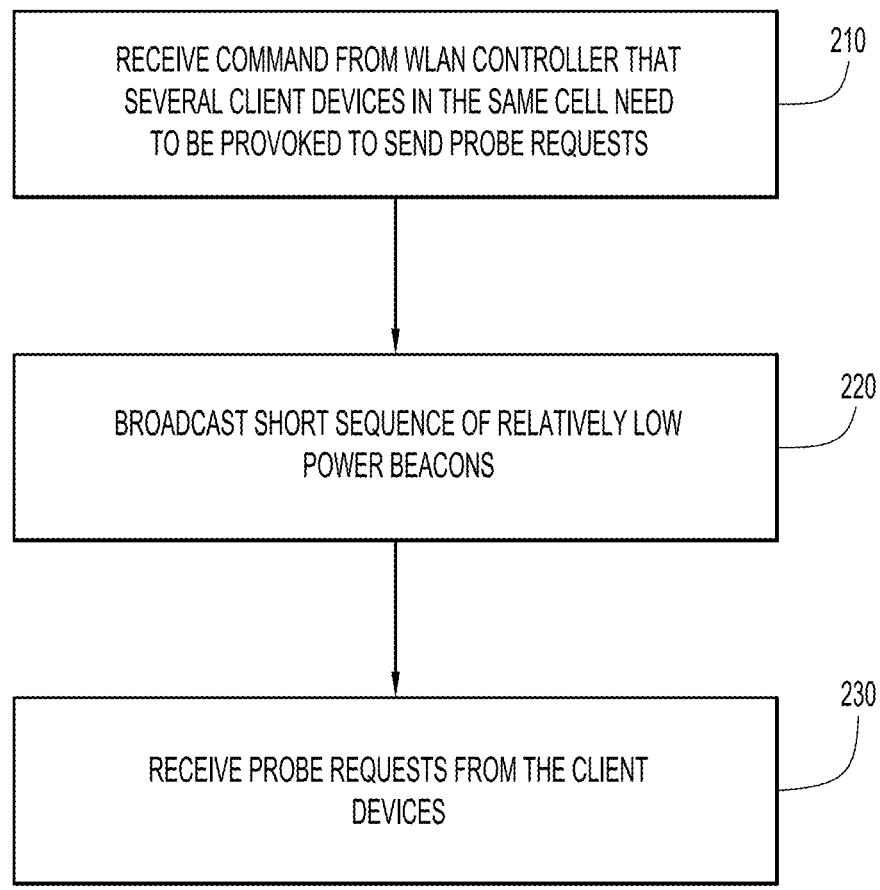
FIG. 6 is a flow chart depicting operations of a first method to provoke a client device to transmit probe request methods, according to an example embodiment.
Figure 7:
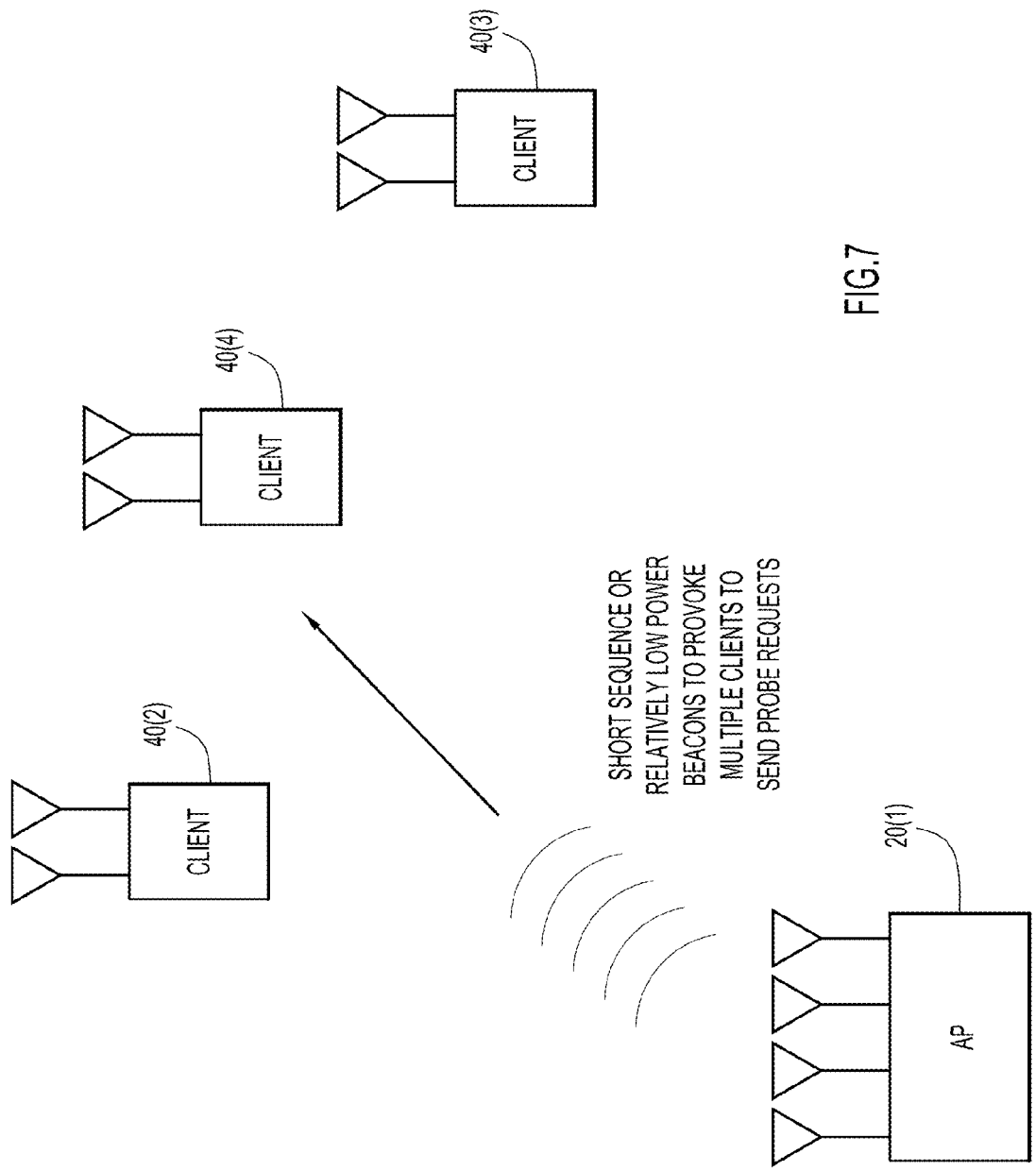
FIG. 7 is a diagram illustrating the method of FIG. 6, according to an example embodiment.

Presented herein are several approaches to trigger a client to transmit probe requests. In a first approach, several clients in the same cell need to be provoked to send a probe request, though this approach is also useful to trigger/provoke a single client to transmit probe requests. This approach is described with reference to FIGS. 6 and 7. FIG. 6 shows a flow chart for a method 200, and FIG. 7 graphically illustrates the operations performed by the AP for method 200. At 210, the AP receives from the WLAN controller a command that indicates that several client devices (e.g., clients 40(2), 40(3) and 40(4) as shown in FIG. 7) in the same cell need to be provoked to send probe requests. At 220, the AP broadcasts a relatively short sequence of relatively low power beacons. That is, the sequence of beacons are transmitted at a reduced transmit power compared to a transmit power normally used to transmit beacons by the AP. This causes the one or more clients that receive the lower power beacons at close range to the AP to send a probe request because the lower power beacons trick/lure each receiving client to determine that it has reached the edge of the cell, since the beacon is received at low signal strength. At 230, the AP (and other APs surrounding the clients) receive the probe requests from the clients. The probe requests transmitted by the clients helps the mobility services server to locate these clients. These lower power beacons will be heard only by clients at close range of the AP, and will therefore only provoke the client devices close to the AP (in the "comfort zone") to think that they may have to check on the AP and thus transmit probe requests. Client devices at the edge of the cell will not receive the lower power beacons, but will probe on their own initiative anyway.

Figure 8:
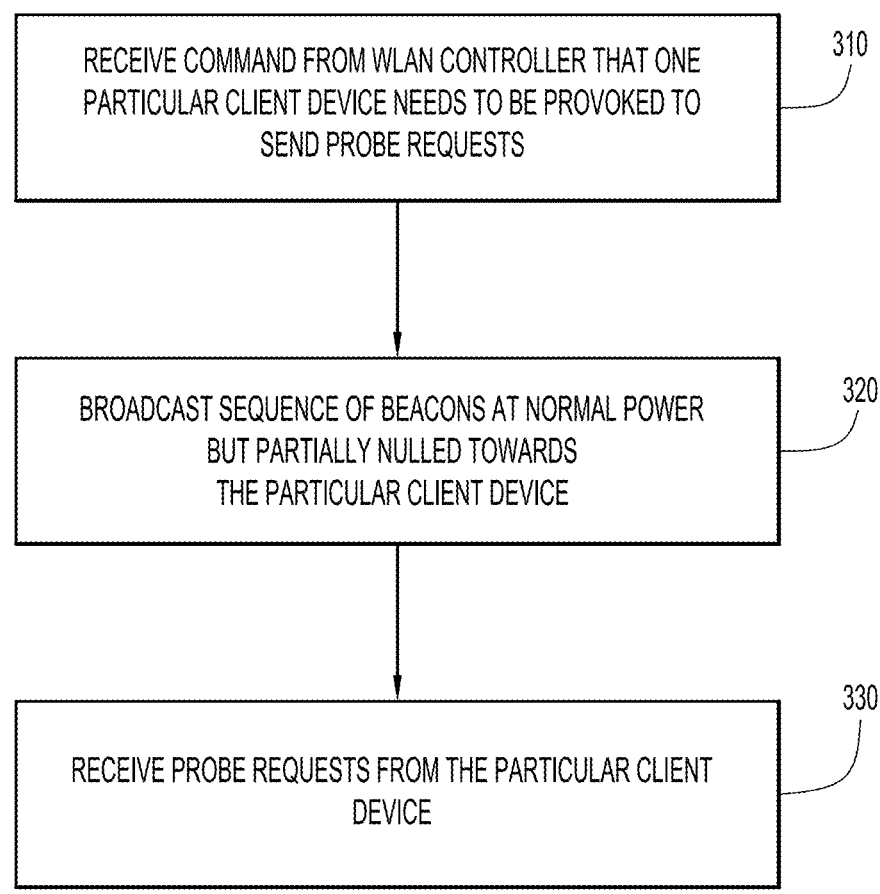
FIG. 8 is a flow chart depicting operations of a second method to provoke a client device to transmit probe request methods, according to an example embodiment.

A second approach is now described with reference to FIGS. 8 and 9. This method is useful when only one specific client needs to be provoked to send a probe request, but can also be used for multiple client devices. FIG. 8 illustrates a flow chart for a method 300 performed at an AP, and FIG. 9 graphically illustrates this method. At 310, the AP receives from the WLAN controller a command to provoke one particular client to transmit probe requests. At 320, the specific client (e.g., client 40(4) in FIG. 9) is targeted by the AP broadcasting a sequence of beacons transmitted at normal power but partially nulled towards the particular client so that the particular client receives the beacons at lower receive signal strength/SNR. This will cause the particular client to transmit a probe request because it believes it is on the edge of a coverage region of its serving AP. A partially nulled beacon will have minimal impact on other clients and therefore will not affect the probing behavior of other clients. This avoids unwanted interference where interference is a problem, at the cost of helping locate only one client rather than multiple.

The nulling operation is performed by way of execution of the beamforming/nulling logic 110 of the AP (FIG. 5). FIG. 9 shows an example in which AP 20(1) transmits beacons with nulling parameters to partially null the beacons (for a predetermined number of beacon intervals) towards the client 40(4). As used herein the term "null" or "nulling" is meant to refer to spatially nulling achieved by applying appropriate antenna weights to a signal to be transmitted across a plurality of antennas of the AP. The nulling of beacons may include initially transmitting beacons with nulling parameters to partially null beacons towards the particular client device and gradually adjusting the nulling parameters over time to increase nulling of beacons towards the particular client device over the predetermined number of beacon intervals. Partially nulling beacons towards the particular client device may involve applying nulling parameters (using antenna weights) that project a transmitted signal (the beacon) on a space at a projection angle that is less than 90 degrees with respect to a direction of a dominant eigenvector of the particular client device. Gradually adjusting the nulling parameters may involve adjusting the nulling parameters to increase the projection angle towards 90 degrees with respect to a direction of the dominant eigenvector of the particular client device.

Alternatively, the nulling may involve fully nulling the beacons towards the particular client for the entirety of the predetermined number of beacon intervals. In other words, full nulling may involve using nulling parameters (antenna weights) that achieve a projection angle substantially equal to 90 degrees with respect to the direction of the dominant eigenvector of the particular client device.

As an example, in a 4×4 multiple-input multiple-output (MIMO) channel, nulling can be achieved by transmitting along the weakest eigenvector of the 4×4 channel. When the intended recipient is a client with one antenna, it is possible to effectively null towards the client since it has only one eigenvector. Even if the client has two antennas, for the transmission/reception of management and control frames only one antenna (one spatial stream, SS=1) is used and the AP performs nulling toward that one antenna, which in fact is the same antenna for which the AP has obtained the client's channel state information, through an acknowledgement (ACK) frame or other uplink frames transmitted by the client.

Nulling is not location specific, rather it is more client specific. Nulling works in a radio frequency (RF) mathematical domain. It may impact other non-intended clients, but statistically that impact on other clients will be minimal. Moreover, the AP can, in advance of performing the nulling operation, determine how correlated the RF channels are for multiple clients. This is an attribute of the environment and can be determined by the AP (or re-determined infrequently to take into account the changes from varying number of clients in a given venue). The AP can cross-correlate the channels of a sufficient number of clients and conclude whether or not the environment is highly correlated by comparing the cross-correlation to a threshold value.

Figure 9:
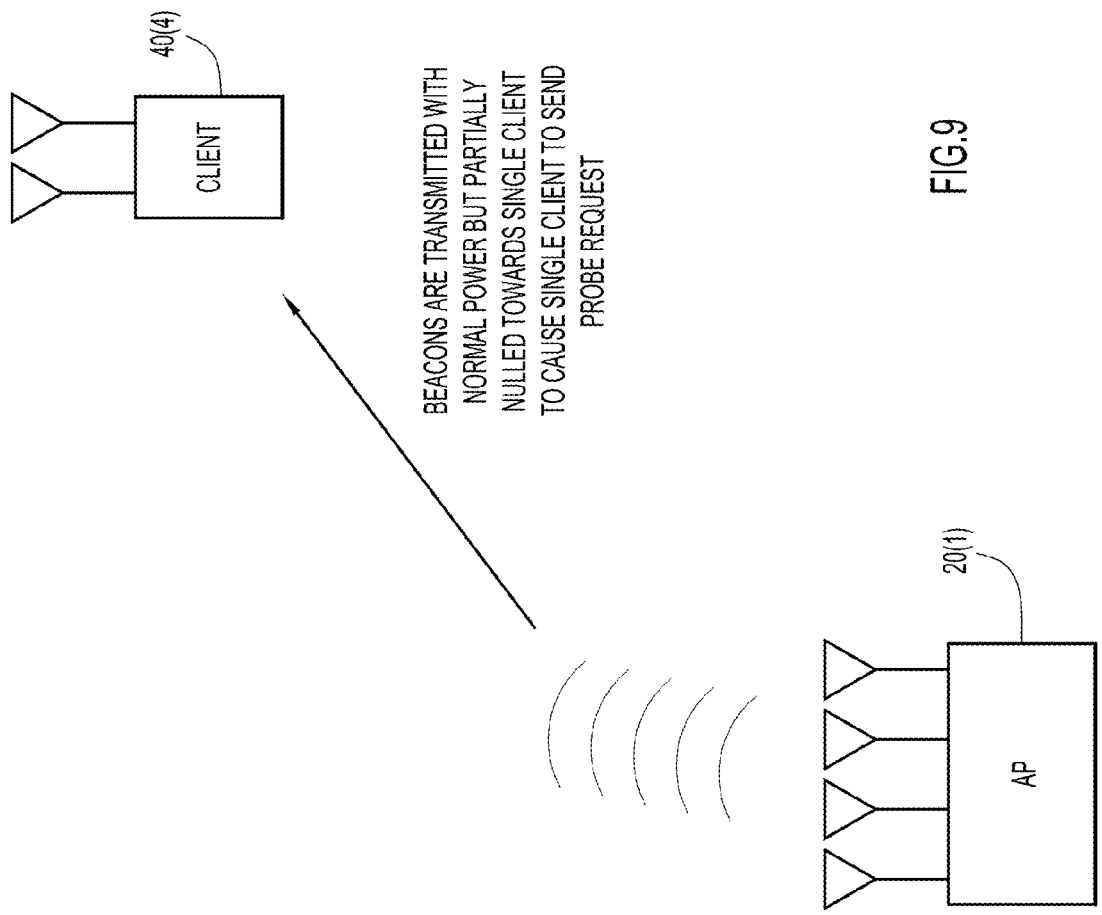
FIG. 9 is a diagram illustrating the method of FIG. 8, according to an example embodiment.

Thus, in general, in accordance with the method depicted in FIGS. 8 and 9, the AP (e.g., the baseband processor) applies nulling parameters that project a transmitted signal (e.g., a beacon) on a space at a projection angle that is less than 90 degrees with respect to a direction of a dominant eigenvector of the at least one target client device. The nulling parameters can be determined by the AP because the AP typically generates and updates beamforming parameters (based on signals received from the client device) to transmit unicast data frames to the client. Thus, the beam-nulling parameters can be derived from the beamforming parameters that the AP maintains for a given client device.

The WLAN controller 40 may choose one of the above approaches based on the number of clients to be located and interference conditions. Neither of these mechanisms is intended to be permanent so that there is no battery depletion risk, nor are these techniques intended to hit all clients at once (only those in a "comfort zone" and therefore not probing at their own initiative). Therefore these techniques have limited impact on client battery usage and on airtime, while enhancing location accuracy when needed.

Probe request triggering is not the only possible mechanism that can be used for static and non-probing clients. When using data RSSI for location, a basic data frame may be sent to the target (non-probing) client and its data frame acknowledgement (ACK) is received back, in order to assess that the global signal level of the client stayed the same since it was previously located. This indicates that the location of the client did not change.

Still another technique is to use a Request-to-Send/Clear-to-Send (RTS/CTS) mechanism (with duration 0), or a simple null frame (ACK expected). Both the unicast frame and low power beacon can be used in combination (one or the other, or both depending on the situation). Furthermore, the low power beacons can be tagged with a vendor information element (IE) that informs the neighbor APs (if they receive that beacon) that this is just for location purposes, and that this is not a spoofing attack.

Figure 10:
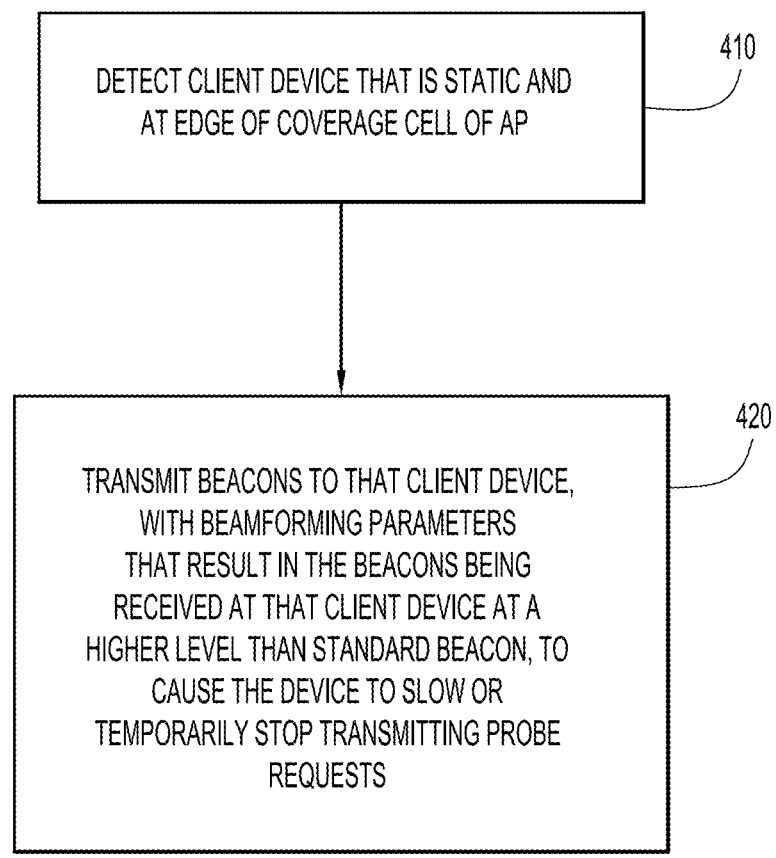
FIG. 10 is a flow chart depicting operations of a method to cause a client device to slow or stop transmitting probe request messages, according to an example embodiment.
Figure 11:
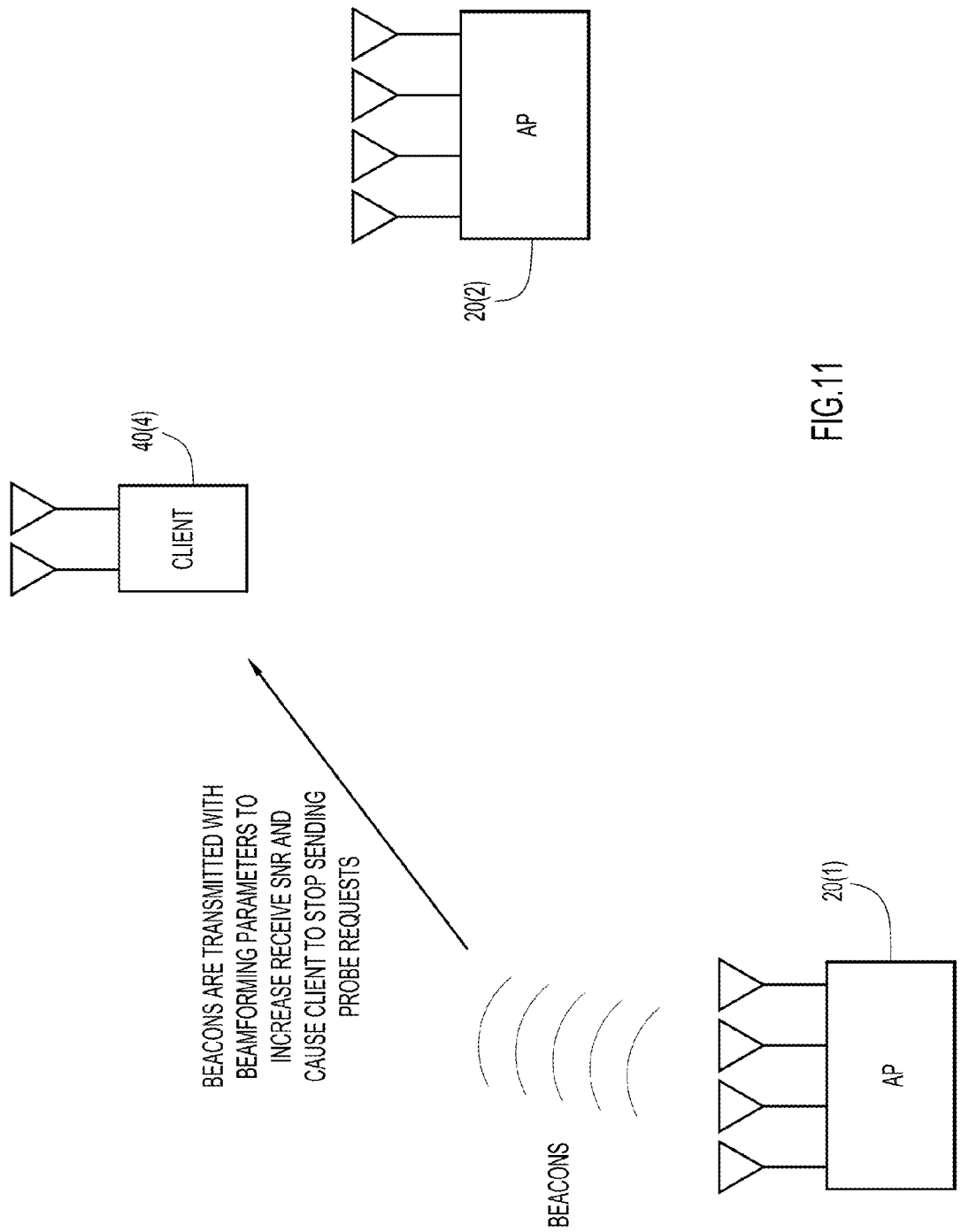
FIG. 11 is a diagram illustrating the method of FIG. 10, according to an example embodiment.

Reference is now made to FIGS. 10 and 11 for a description of a further embodiment. Client devices that are static at the edge of a cell are identified. Two different mechanisms can be used detect a client device that is static at the edge of a cell. First, if the received signal level at the AP from the client device does not change much over a given period of time, then the client device is said to be static. Second, the behavior of the client device is otherwise consistent with a static position. This can be established by the frequency of probe requests (probe sequences are different depending upon whether the AP's signals, from the client device's perspective, is stable or changing).

FIG. 10 illustrates a flow chart for a method 400 and FIG. 11 illustrates the operation of the method 400 performed by an AP. Method 400 causes a client device (e.g., client 40(4)) to stop or slow down its rate of transmission of probe requests. Once a client device is identified to be static and at the edge of an AP's coverage region, the AP beamforms one or more "stronger" beacon to that device, to lure the device into thinking that the AP is at short range. At 410, an AP detects that a client device is static (not moving) and at the edge of its coverage region/cell. The techniques to make this determination are described above. At 420, the AP transmits to that client device a beacon with beamforming parameters that result in the beacon being received at the client device at a higher receive signal level than a standard beacon. In other words, at 420, the AP transmits beacons with beamforming parameters to beamform the one or more beacons towards at least one client device that results in the one or more beacons being received at the at least one client device with a greater strength than beacons which are not beamformed to the client device. This will cause the client device to slow or temporarily stop transmitting probe request messages. The AP knows the beamforming parameters to use for beamforming the beacons because it generates and uses those beamforming parameters when sending data to that client device. These beamforming parameters (e.g., complex antenna weights) that would normally be used to transmit unicast data frames are used by the AP to beamform beacons towards the client device.

Figure 12:
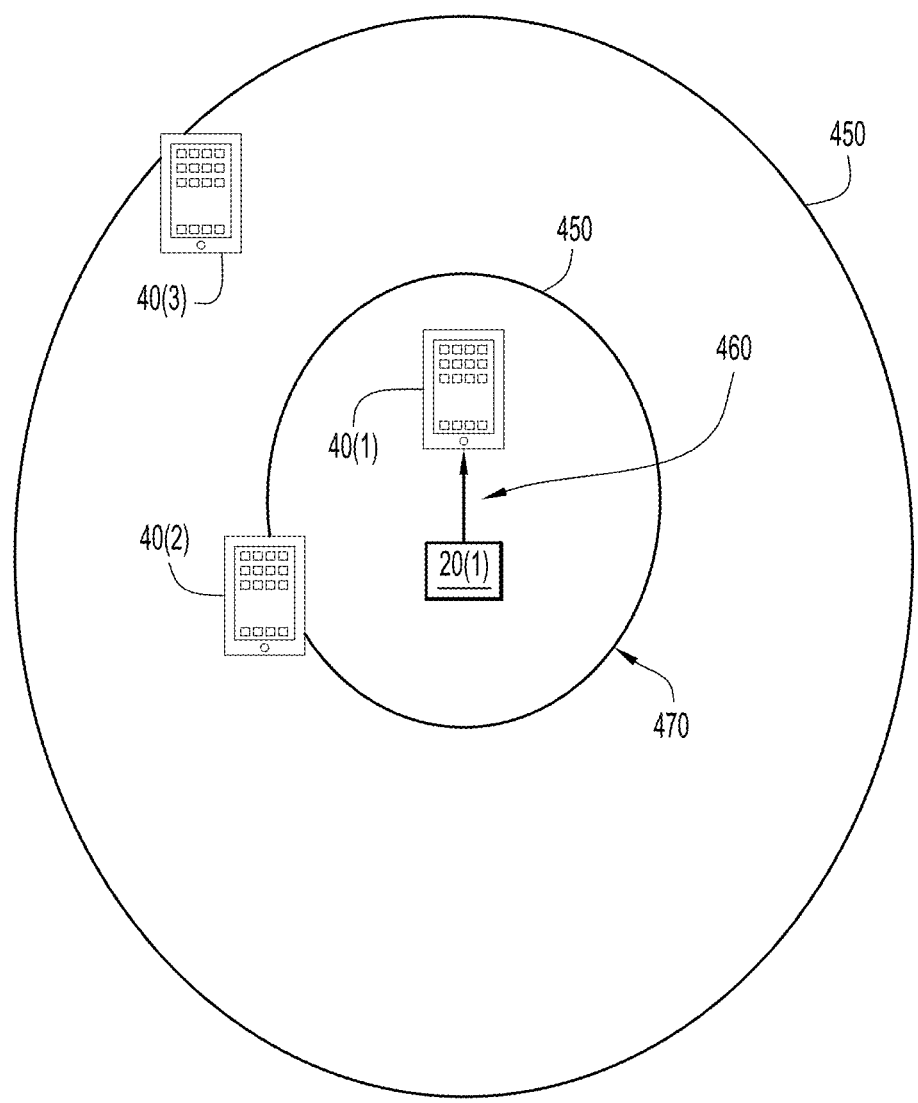
FIG. 12 illustrates still another example in which beacons are transmitted to client devices in order to provoke client devices to transmit probe request messages, according to an example embodiment.
Figure 13:
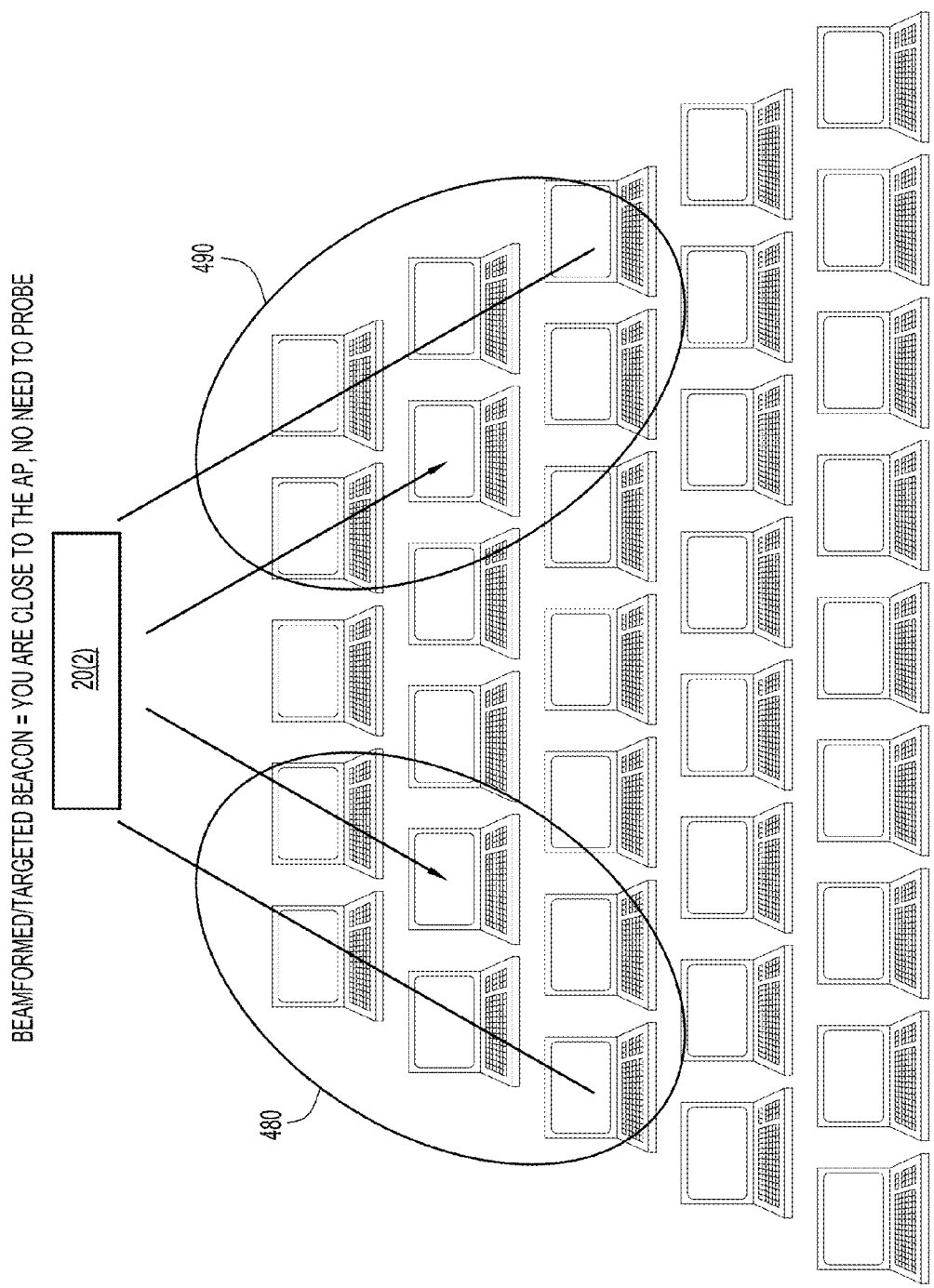
FIG. 13 illustrates an example in which beacons are beamformed towards client devices to cause the client devices to slow or temporarily stop transmitting probe request messages, according to an example embodiment.

FIGS. 12 and 13 illustrate further examples of the techniques described above. In FIG. 12, an AP is shown at reference numeral 20(1) that serves clients 40(1)-40(3) within a coverage region 450. In this example, even though client 40(1) is relatively close to the AP 20(1), if probe request messages have not been received from the client 40(2), the AP 20(1) sends, at 460, partially nulled beacons to trigger the client 40(1) to act as if it is far from the AP 20(1) and thus needs to transmit probe request messages. In addition, at 470, the AP 20(1) may transmit lower power beacons to trigger multiple clients to transmit probe request messages.

FIG. 13 shows an example in which there are numerous densely dispersed client devices served by an AP 20(2). In this example, the AP 20(2), as shown at reference numerals 480 and 490, transmits strong/beamformed beacons towards individual clients to cause those clients to slow or temporarily stop transmitting probe request messages.

Figure 14:
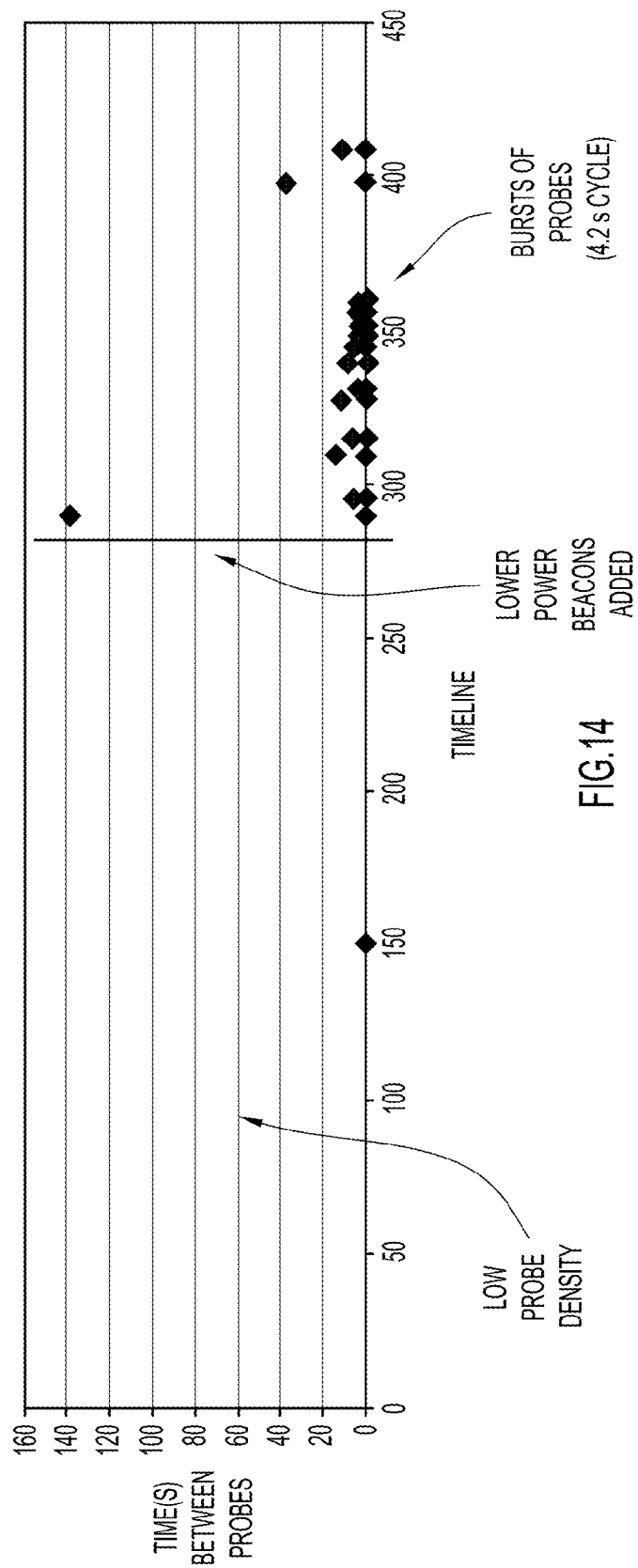
FIG. 14 is a plot illustrating example simulation results when lower power beacons are transmitted towards one or more client devices, according to an example embodiment.

FIG. 14 illustrates actual data from an example in which lower power beacons were transmitted towards one or more clients. As shown in the figure, for a period of time from 0-275, very few probe request messages are received from one or more clients. At some point in time, e.g., T=275, lower power beacons are transmitted. Thereafter, it can be seen that the number of probe request messages transmitted by the one or more clients dramatically increased.

In another embodiment, a local profiling mechanism is implemented on the WLAN controller, for example, to assign a probing profile to each client device (Android® operating system, Apple IOS® operating system, etc.). This profile is used to establish the client device view of the network based on the probing behavior of that device. For example, a 122 second probe pattern from some Android devices means that the device determines that it is at the edge of the cell, but is not mobile. Therefore, it is not necessary to be concerned about the signal changes at this device; its location is constant as long as the probing pattern does not change. Again, the probing behavior of many types of client devices (in particular BYODs) has been studied and is known.

The probing pattern may change over operating system (OS) release versions and hardware platforms. It is not necessary to exhaustively characterize all devices and vendors; a few major vendors make a large proportion of the BYOD market. As these vendors change their device behavior in new releases, the probing behavior techniques presented herein can be adjusted.

Figure 15:
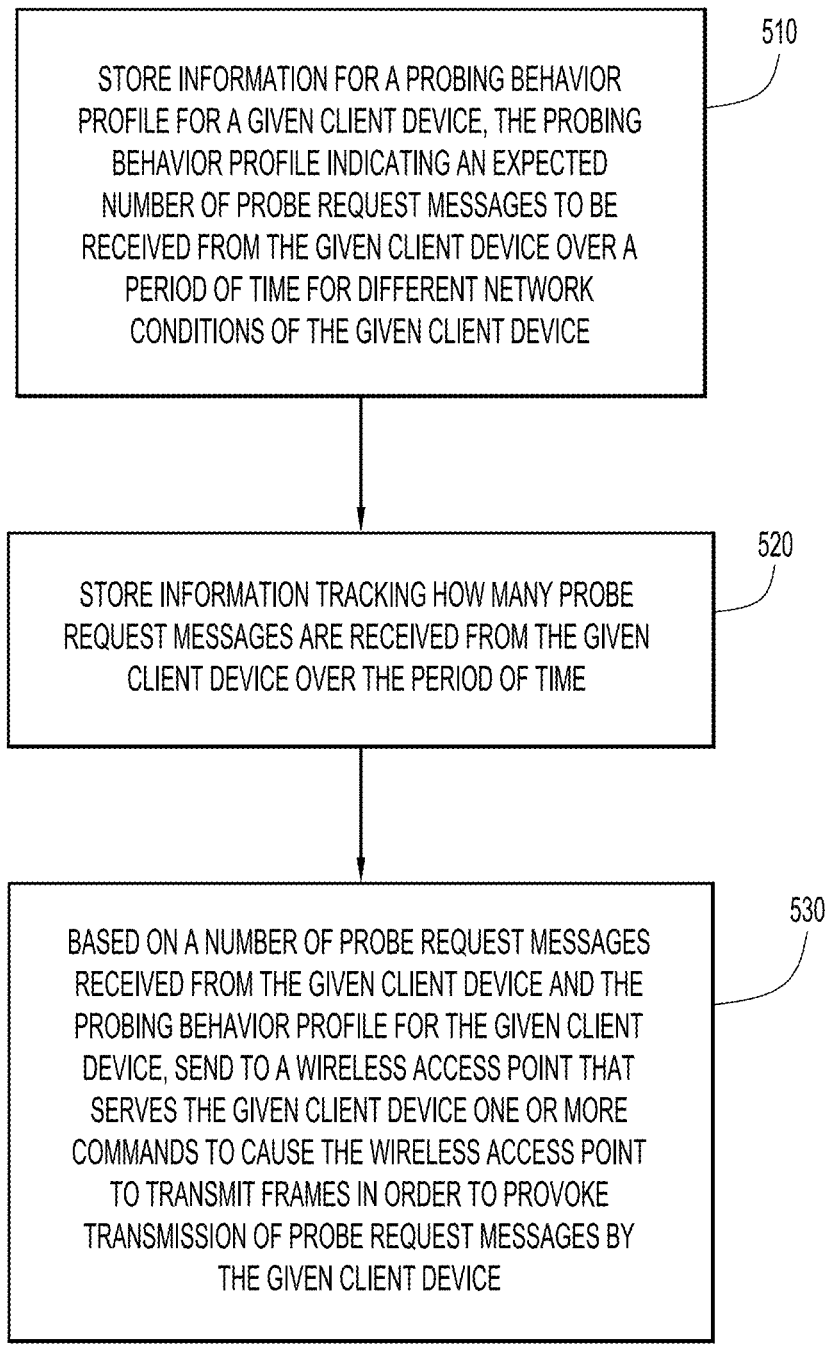
FIG. 15 is a flow chart illustrating a method according to still another example embodiment.

FIG. 15 is a flow chart for a method 500 performed by a WLAN controller or similar entity in connection with this probing profile mechanism. At 510, information is stored for a probing behavior profile for a given client device. The probing behavior profile indicates an expected number of probe request messages to be received from the given client device over a period of time for different network conditions of the given client device. At 520, information is stored that tracks how many probe request messages are received from the given client device over the period of time. At 530, based on a number of probe request messages received from the given client device and the probing behavior profile for the given client device, the WLAN controller sends to a wireless access point that serves the given client device one or more commands to cause the wireless access point to transmit frames in order to provoke transmission of probe request messages by the given client device. The probing behavior profile may be updated for release version updates of operating systems of the given client device, and for a plurality of other client devices similar to the given client device. The WLAN controller may further perform the operations depicted in FIG. 3 in connection with the method 500 shown in FIG. 15.

To summarize, the techniques presented herein allows for filtering and/or stopping excessive probe request messages in one case (too many probes and no significant movement of a client), and in another case, to trigger client devices to transmit probe request message for location purposes. Lower power beacons are used to lure wireless clients into thinking that they are at the edge of the cell, and thus triggering the client(s) into sending probe requests, thus enhancing location accuracy (on demand). Conversely, beacons are beamformed to clients that are static at the edge of a coverage region and probing too frequently (wasting airtime and battery life), to lure the clients into determining that the AP is near, thus slowing down or temporarily stopping their probe requests.

In summary, in one form, a wireless access point is provided comprising: at least one transmitter associated with a corresponding antenna; and a processor coupled to the transmitter, wherein the processor causes frames to be transmitted by the at least one transmitter so that the frames are received by the at least one client device with a receive signal strength so as to control the transmission of probe request messages by the at least one client device. In addition, a system is provided that includes a wireless network controller and the wireless access point of claim, wherein the wireless network controller tracks how many probe request messages are received from each of one or more client devices over a predetermined period of time, and sends to the wireless access point the one or more commands to cause the wireless access point to transmit frames in order to provoke transmission of probe request messages by one or more client devices associated with the wireless access point with a number of probe request messages for a given client device is less than a threshold.

In addition, a method is provided comprising, at a wireless access point that serves at least one client device in a wireless local area network, transmitting frames to the at least one client device so that the frames are received by at least one client device with a receive signal strength so as to control the transmission of probe request messages by the at least one client device.

In another form, a method is provided comprising: for a wireless network including one or more wireless access points each of which serves one or more client devices, storing information indicating receipt of probe request messages by the one or more wireless access points that were transmitted by the one or more client devices; comparing a number of probe request messages received over a time interval with an index for each of the one or more client devices; if the index has been exceeded for a given client device, discarding probe request messages received during the time interval for the given client device; and if the index has not been exceeded for a given client device, forwarding probe request messages received during the time interval for the given client device to a location service function.

In addition, a method is provided comprising: at a wireless network controller that is in communication with one or more wireless access points each of which serves one or more client devices in a wireless network: storing information for a probing behavior profile for a given client device, the probing behavior profile indicating an expected number of probe request messages to be received from the given client device over a period of time for different network conditions of the given client device; storing information tracking how many probe request messages are received from the given client device over the period of time; and based on a number of probe request messages received from the given client device and the probing behavior profile for the given client device, sending to a wireless access point that serves the given client device one or more commands to cause the wireless access point to transmit frames in order to provoke transmission of probe request messages by the given client device.

The above description is intended by way of example only. Various modifications and structural changes may be made therein without departing from the scope of the concepts described herein and within the scope and range of equivalents of the claims.

What is claimed is:

1. A wireless access point comprising:
   at least one transmitter associated with a corresponding antenna; and
   a processor coupled to the transmitter, wherein the processor causes frames to be transmitted by the at least one transmitter so that the frames are received by at least one client device with a receive signal strength so as to cause the at least one client device to determine a determined distance between the at least one client device and the wireless access point, such that a frequency of transmission of probe request messages transmitted by the at least one client device is increased or decreased based on the determined distance, wherein:
   if the receive signal strength increases, the at least one client device determines that the determined distance is smaller than the at least one client device would have determined if the receive signal strength had not increased, thereby causing the at least one client device to decrease the frequency of transmission of probe request messages; and
   if the receive signal strength decreases, the at least one client device determines that the determined distance is greater than the at least one client device would have determined if the receive signal strength had not decreased, thereby causing the at least one client device to increase the frequency of transmission of probe request messages.

2. The wireless access point of claim 1, wherein the processor causes beacons to be transmitted by the at least one transmitter so that the beacons are received by the at least one client device with a reduced strength so as to provoke the at least one client device to transmit probe request messages.

3. The wireless access point of claim 2, wherein the processor causes a sequence of beacons to be transmitted by the at least one transmitter at a reduced transmit power compared to a transmit power normally used to transmit beacons by the wireless access point.

4. The wireless access point of claim 2, and comprising a plurality of transmitters each associated with a corresponding one of a plurality of antennas, and wherein the processor causes a sequence of beacons to be transmitted with nulling parameters via the plurality of antennas to partially null the sequence of beacons towards the at least one client device.

5. The wireless access point of claim 4, wherein the processor applies the nulling parameters that project a transmitted signal on a space at a projection angle that is less than 90 degrees with respect to a direction of a dominant eigenvector of the at least one client device.

6. The wireless access point of claim 1, wherein the processor causes one or more beacons to be transmitted using beamforming parameters to beamform the one or more beacons towards the at least one client device that results in the one or more beacons being received at the at least one client device with a greater strength than beacons that are not beamformed to the at least one client device, so as to cause the at least one client device to slow or stop transmitting probe request messages.

7. The wireless access point of claim 1, wherein the processor is responsive to one or more commands received from a wireless network controller.

8. A system including the wireless network controller and the wireless access point of claim 7, wherein the wireless network controller tracks how many probe request messages are received from each of one or more client devices over a predetermined period of time, and sends to the wireless access point the one or more commands to cause the wireless access point to transmit frames in order to provoke transmission of probe request messages by one or more client devices associated with the wireless access point when a number of probe request messages for a given client device is less than a threshold.

9. The wireless access point of claim 1, wherein the processor:
   stores information indicating receipt of probe request messages by the wireless access point that were transmitted by one or more client devices;
   compares a number of probe request messages received over a time interval with an index for each of the one or more client devices;
   if the index has been exceeded for a given client device, discards probe request messages received during the time interval for the given client device; and
   if the index has not been exceeded for the given client device, forwards probe request messages received during the time interval for the given client device to a location service function.

10. The wireless access point of claim 9, wherein the processor adjusts the index for the given client device in order to change a frequency at which probe request messages are forwarded to the location service function for location determinations made by the location service function for the given client device.

11. The wireless access point of claim 1, wherein the processor:
  stores information for a probing behavior profile for a given client device, the probing behavior profile indicating an expected number of probe request messages to be received from the given client device over a period of time for different network conditions of the given client device;
  stores information tracking how many probe request messages are received from the given client device over the period of time; and
  based on a number of probe request messages received from the given client device and the probing behavior profile for the given client device, sends to the wireless access point that serves the given client device one or more commands to cause the wireless access point to transmit frames in order to provoke transmission of probe request messages by the given client device.

12. The wireless access point of claim 11, wherein the processor updates the probing behavior profile based on release version updates of operating systems of the given client device.

13. A method comprising:
  at a wireless access point that serves at least one client device in a wireless local area network, transmitting frames to the at least one client device so that the frames are received by the at least one client device with a receive signal strength so as to cause the at least one client device to determine that a determined distance between the at least one client device and the wireless access point such that a frequency of transmission of probe request messages transmitted by the at least one client device is increased or decreased based on the determined distance, wherein:
  if the receive signal strength increases, the at least one client device determines that the determined distance is smaller than the at least one client device would have determined if the receive signal strength had not increased, thereby causing the at least one client device to decrease the frequency of transmission of probe request messages; and
  if the receive signal strength decreases, the at least one client device determines that the determined distance is greater than the at least one client device would have determined if the receive signal strength had not decreased, thereby causing the at least one client device to increase the frequency of transmission of probe request messages.

14. The method of claim 13, wherein transmitting comprises transmitting a sequence of beacons at a reduced transmit power compared to a transmit power normally used to transmit beacons by the wireless access point.

15. The method of claim 14, wherein the beacons in the sequence include an information element that informs other wireless access points that the beacons are for location purposes.

16. The method of claim 13, wherein transmitting comprises transmitting a sequence of beacons with nulling parameters via a plurality of antennas of the wireless access point to partially null the sequence of beacons towards the at least one client device.

17. The method of claim 16, wherein transmitting comprises applying the nulling parameters that project a transmitted signal on a space at a projection angle that is less than 90 degrees with respect to a direction of a dominant eigenvector of the at least one client device.

18. The method of claim 13, wherein transmitting comprises transmitting one or more beacons with beamforming parameters to beamform the one or more beacons towards the at least one client device that results in the one or more beacons being received at the at least one client device at a greater strength than beacons that are not beamformed to the at least one client device, so as to cause the at least one client device to slow or stop transmitting probe request messages.

19. The method of claim 13, further comprising receiving one or more commands from a wireless network controller, and wherein transmitting is responsive to the one or more commands.

20. The method of claim 19, further comprising tracking how many probe request messages are received from each of one or more client devices over a predetermined period of time, and sending to the wireless access point the one or more commands to cause the wireless access point to transmit frames in order to provoke transmission of probe request messages by one or more client devices associated with the wireless access point when a number of probe request messages for a given client device is less than a threshold.

21. The method of claim 13, wherein the frames are part of a Request-to-Send/Clear-to-Send (RTS/CTS) mechanism with duration set to zero.

22. The method of claim 13, further comprising:
  storing information indicating receipt of probe request messages by the wireless access point that were transmitted by one or more client devices;
  comparing a number of probe request messages received over a time interval with an index for each of the one or more client devices;
  if the index has been exceeded for a given client device, discarding probe request messages received during the time interval for the given client device; and
  if the index has not been exceeded for the given client device, forwarding probe request messages received during the time interval for the given client device to a location service function.

23. The method of claim 22, further comprising adjusting the index for the given client device in order to change a frequency at which probe request messages are forwarded to the location service function for location determinations made by the location service function for the given client device.

24. The method of claim 23, further comprising displaying a graphical user interface that includes one or more graphical elements that can be manipulated in order to adjust the index for the given client device.

25. The method of claim 13, further comprising a wireless network controller:
  storing information for a probing behavior profile for a given client device, the probing behavior profile indicating an expected number of probe request messages to be received from the given client device over a period of time for different network conditions of the given client device;
  storing information tracking how many probe request messages are received from the given client device over the period of time; and
  based on a number of probe request messages received from the given client device and the probing behavior profile for the given client device, sending to the wireless access point that serves the given client device one or more commands to cause the wireless access point to transmit frames in order to provoke transmission of probe request messages by the given client device.

26. The method of claim 25, further comprising updating the probing behavior profile based on release version updates of operating systems of the given client device.

27. The method of claim 25, further comprising:
comparing a number of probe request messages received over a time interval from the given client device with an index;
if the index has been exceeded for the given client device, discarding probe request messages received during the time interval for the given client device; and
if the index has not been exceeded for the given client device, forwarding probe request messages received during the time interval for the given client device to a location service function.

* * * * *